(12) United States Patent
Lerner et al.

(10) Patent No.: US 7,458,688 B2
(45) Date of Patent: *Dec. 2, 2008

(54) PRISM

(75) Inventors: Scott Lerner, Corvallis, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/101,819

(22) Filed: Apr. 8, 2005

(65) Prior Publication Data

US 2006/0227294 A1   Oct. 12, 2006

(51) Int. Cl.
G03B 21/00 (2006.01)
G03B 21/28 (2006.01)

(52) U.S. Cl. .......................................... 353/33; 353/81
(58) Field of Classification Search ................... 353/33, 353/81, 20, 30, 31; 359/831–837
See application file for complete search history.

(56) References Cited

U.S. PATENT DOCUMENTS

| | | | |
|---|---|---|---|
| 2,754,718 A * | 7/1956 | Rock et al. | 156/281 |
| 5,604,624 A | 2/1997 | Magarill et al. | |
| 6,019,474 A * | 2/2000 | Doany et al. | 353/33 |
| 6,349,006 B1 | 2/2002 | Okamori et al. | |
| 6,517,209 B2 * | 2/2003 | Huang | 353/81 |
| 6,644,813 B1 | 11/2003 | Bowron | |
| 6,685,342 B2 * | 2/2004 | Terada | 362/327 |
| 6,840,634 B1 | 1/2005 | Chang | |
| 7,167,314 B2 * | 1/2007 | Lerner et al. | 359/629 |
| 2002/0021505 A1 | 2/2002 | Lee | |
| 2002/0033992 A1 | 3/2002 | Den Bossche et al. | |
| 2002/0196555 A1 | 12/2002 | Edlinger et al. | |
| 2003/0123162 A1 | 7/2003 | Penn | |
| 2003/0189692 A1 | 10/2003 | Kawano et al. | |
| 2004/0057023 A1 | 3/2004 | Colpaert | |
| 2004/0075903 A1 * | 4/2004 | Dubin et al. | 359/495 |
| 2004/0233679 A1 | 11/2004 | Ferri et al. | |
| 2004/0246442 A1 | 12/2004 | Lee et al. | |
| 2005/0018146 A1 * | 1/2005 | Chang et al. | 353/98 |
| 2006/0164600 A1 * | 7/2006 | Morejon et al. | 353/31 |

* cited by examiner

Primary Examiner—Rodney E Fuller

(57) ABSTRACT

A prism includes a first internal reflection interface and a second internal reflection interface. The second internal reflection interface is crossed relative to the first internal reflection interface.

22 Claims, 4 Drawing Sheets

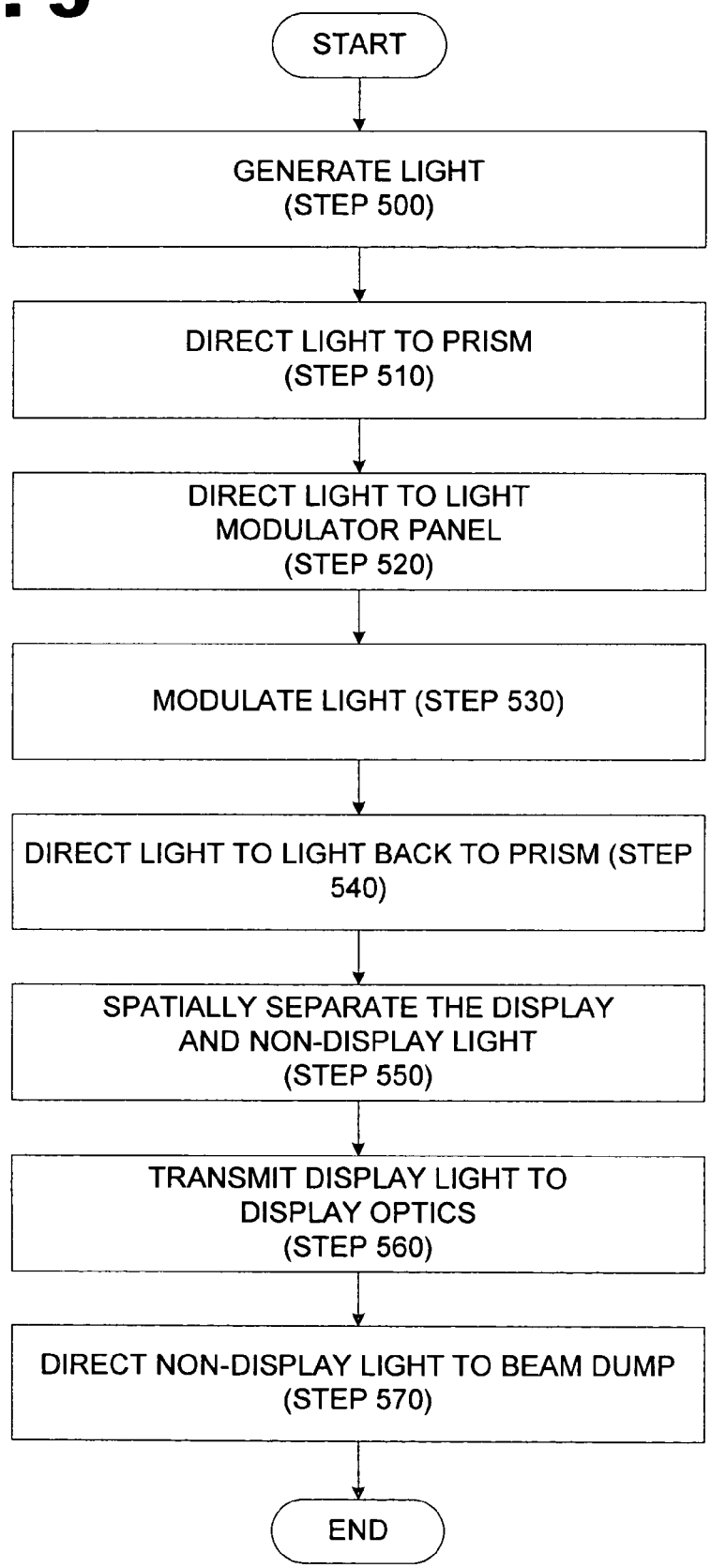

PRISM

BACKGROUND

Micro-electromechanical systems (MEMS) are used in a variety of applications, including optical display systems. Such systems often include a light source that projects light rays onto a light modulator panel. In many optical display systems, the light modulator panel includes an array of MEMS devices commonly referred to as pixels. The pixels modulate light to control its color, intensity, hue, or other characteristics.

For example, some pixels include reflective plates that are selectively tilted to direct light along a desired path. More specifically, when such pixels are in an ON state, the reflective plate is tilted such that the pixels direct light incident thereon to the display optics, which focus the light onto a display surface. Similarly, when such pixels are in an OFF state, the reflective plate is oriented such that the light is directed away from the display surface. By controlling the frequency with which the light is directed from each pixel to the display surface, each pixel is able to produce an output that varies from light to dark on the display surface. By properly controlling an array of pixels, a full image may be formed.

Some systems make use of a prism to separate the display light from the non-display light. In particular, such prisms frequently include a single, total internal reflection interface to direct light from the light source to the light modulator panel. The light modulator panel then directs the display light back through the prism and to the display surface while the tilt of the mirrors directs the non-display light away from the display surface. The degree to which the display light and non-display light are separated depends in large part on the change in angle of the reflective plates between an ON state and an OFF state.

Further, according to such systems the back focal distance, or the distance from the modulator to the display optics, may depend on where light rays from the edges of the light modulator panel intersect. In particular, a back focal distance in which the display light and non-display light are sufficiently separated may depend on the point where a non-display ray from the edge of the light modulator panel nearest the light source intersects a display edge from the opposite edge of the light modulator panel. The intersection of these rays may represent the point at which the non-display and display light are separated. Thus, placing the back focal distance at a location beyond the point of intersection may help ensure that non-display light is not directed to the display optics. The location of this point of intersection frequently depends on the angle of rotation of the reflective plates at their ON and OFF states. As a result, systems making use of reflective plates with relatively small angles of rotation and a single reflection interface may have relatively large back focal distances. Relatively large focal distances may correspond to relatively large systems.

SUMMARY

A prism includes a first internal reflection interface and a second internal reflection interface. The second internal reflection interface is crossed relative to the first internal reflection interface.

BRIEF DESCRIPTION OF THE DRAWINGS

The accompanying drawings illustrate various embodiments of the present apparatus and methods and are a part of the specification. The illustrated embodiments are merely examples of the present apparatus and methods and do not limit the scope of the disclosure.

FIG. 5 is a flowchart illustrating a method of modulating light according to one exemplary embodiment.

Throughout the drawings, identical reference numbers designate similar, but not necessarily identical, elements.

DETAILED DESCRIPTION

A prism is described herein for use in projection assemblies. In particular, a prism is described that includes crossed internal reflection interfaces. Each internal reflection interface is configured to selectively transmit or reflect a light ray incident thereon according to each light ray's angle of incidence. For example, those light rays with an angle of incidence that are below a critical angle of incidence are transmitted through the internal reflection interface, while light rays with an angle of incidence above the critical angle will be reflected by the internal reflection interface.

As introduced, the prism includes crossed internal reflection interfaces. The crossed internal reflection interfaces direct light from a light source module to a light modulator panel. The light modulator panel then directs display and non-display light back to the prism. The prism directs display light to a projection lens and non-display light to a beam dump. According to exemplary embodiments discussed below, the prism provides spatial separation of the projection and non-display light, thereby minimizing the possibility that non-display light will dilute the display light while minimizing the angle of rotation required for such separation. As a result, the prism may provide for a relatively short back focal distance (BFD) as well as an increased contrast ratio of a displayed image. An exemplary display system will first be discussed, followed by a discussion of a projection assembly and the paths taken by various light rays through the projection assembly.

In the following description, for purposes of explanation, numerous specific details are set forth in order to provide a thorough understanding of the present methods and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display Systems

Figure 1:
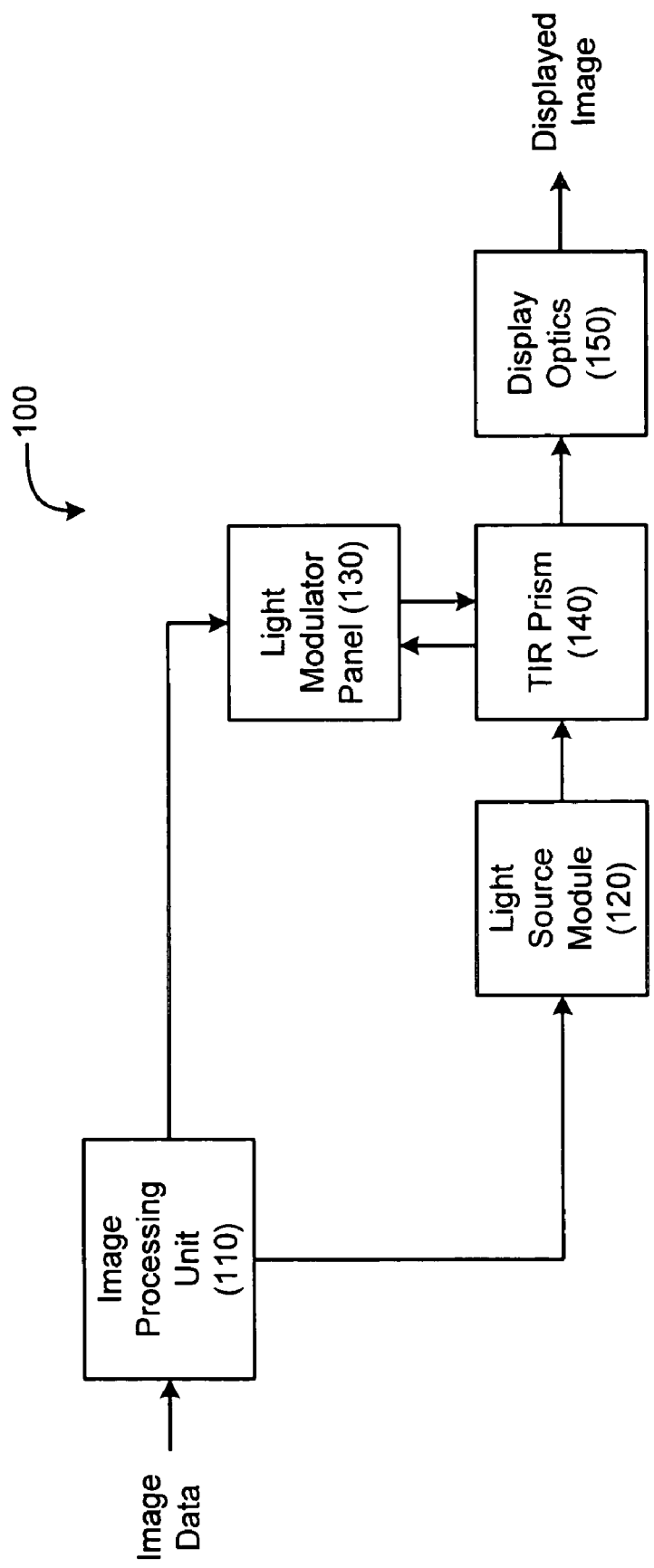
FIG. 1 illustrates a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110).

The image processing unit (110) performs various functions including controlling the illumination of a light source module (120) and controlling a light modulator panel (130). The light source module (120) directs light toward a total internal reflection prism (TIR prism) (140), which in turn directs the light to the light modulator panel (130).

The light source module (120), according to the present exemplary embodiment, is configured to provide sequentially varying light. In particular, the light source module may be configured to sequentially provide red, green, and blue light respectively. For example, the light source module (120) may include a color wheel, as is known in the art, to provide sequentially varying light to the TIR prism (140). The light source module (120) may also include an integrator. An integrator may spatially homogenize the sequentially varying light. The integrator then directs the light to an illumination relay, which may also be part of the light source module (120), which directs the light to the TIR prism (140).

The light modulator panel (130) includes one or more arrays of light modulator devices. The light modulator devices may be in the form of micro-electro mechanical (MEMS) devices, or pixels, which are configured to selectively reflect light incident thereon toward a display, as discussed below. A portion of the light directed to the light modulator panel (130) is modulated by the pixel arrays. This modulated light is then passed back to the TIR prism (140), which directs the modulated light to display optics (150). The display optics (150) focus the modulated light onto a display surface to form an image. The non-modulated portion of the light directed to the light modulator panel (130) is reflected away from the display optics (150), as will be discussed in more detail below.

The display optics (150) may comprise any device configured to display or project an image. For example, the display optics (150) may be, but are not limited to, a lens configured to project and focus an image onto a viewing surface. The viewing surface may be, but is not limited to, a screen, television, wall, liquid crystal display (LCD), or computer monitor.

Projection Assembly with Total Internal Reflection Prism

Figure 2:
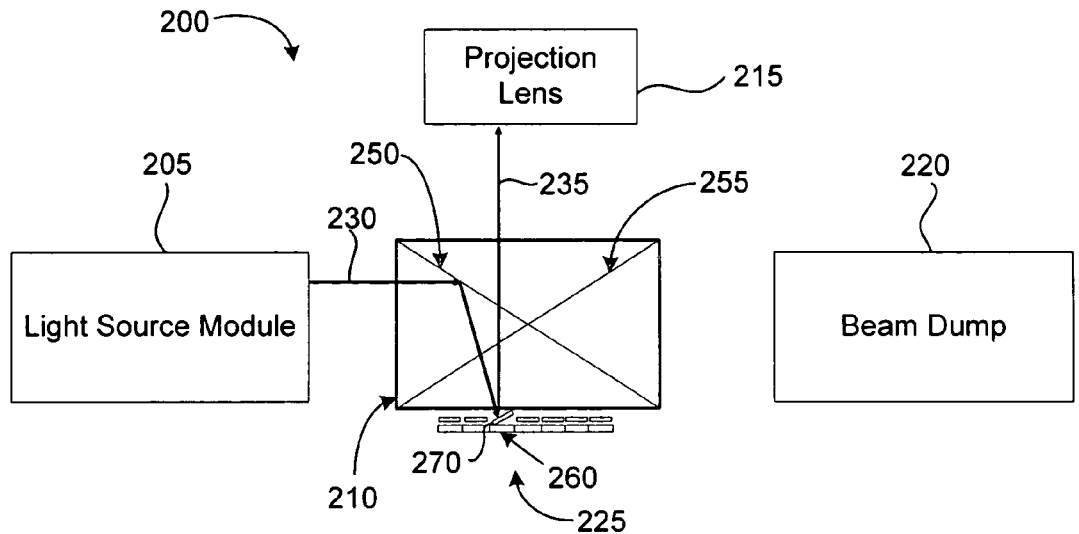
FIG. 2 illustrates the path of display light through a projection assembly according to one exemplary embodiment.
Figure 3:
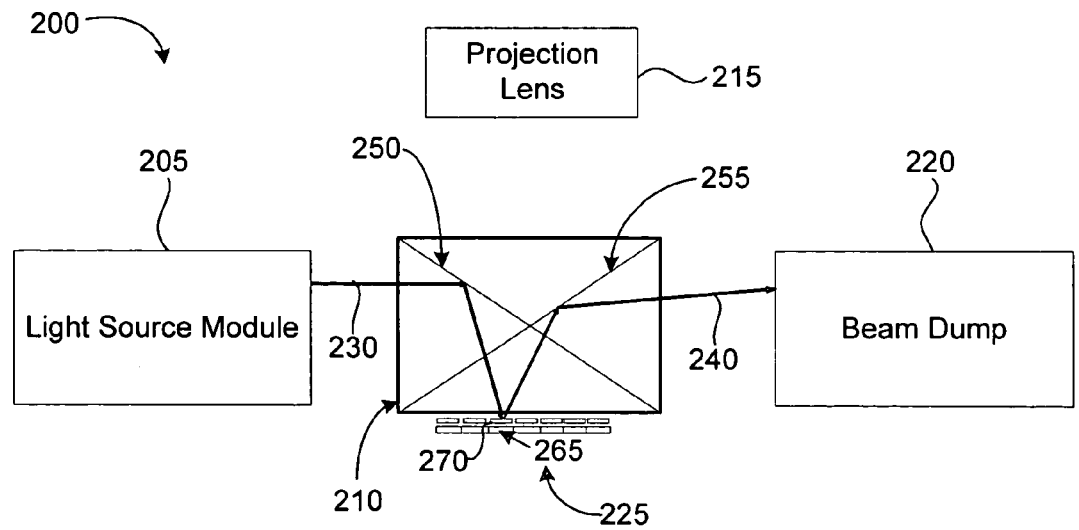
FIG. 3 illustrates the path of non-display light through a projection assembly according to one exemplary embodiment.
Figure 4:
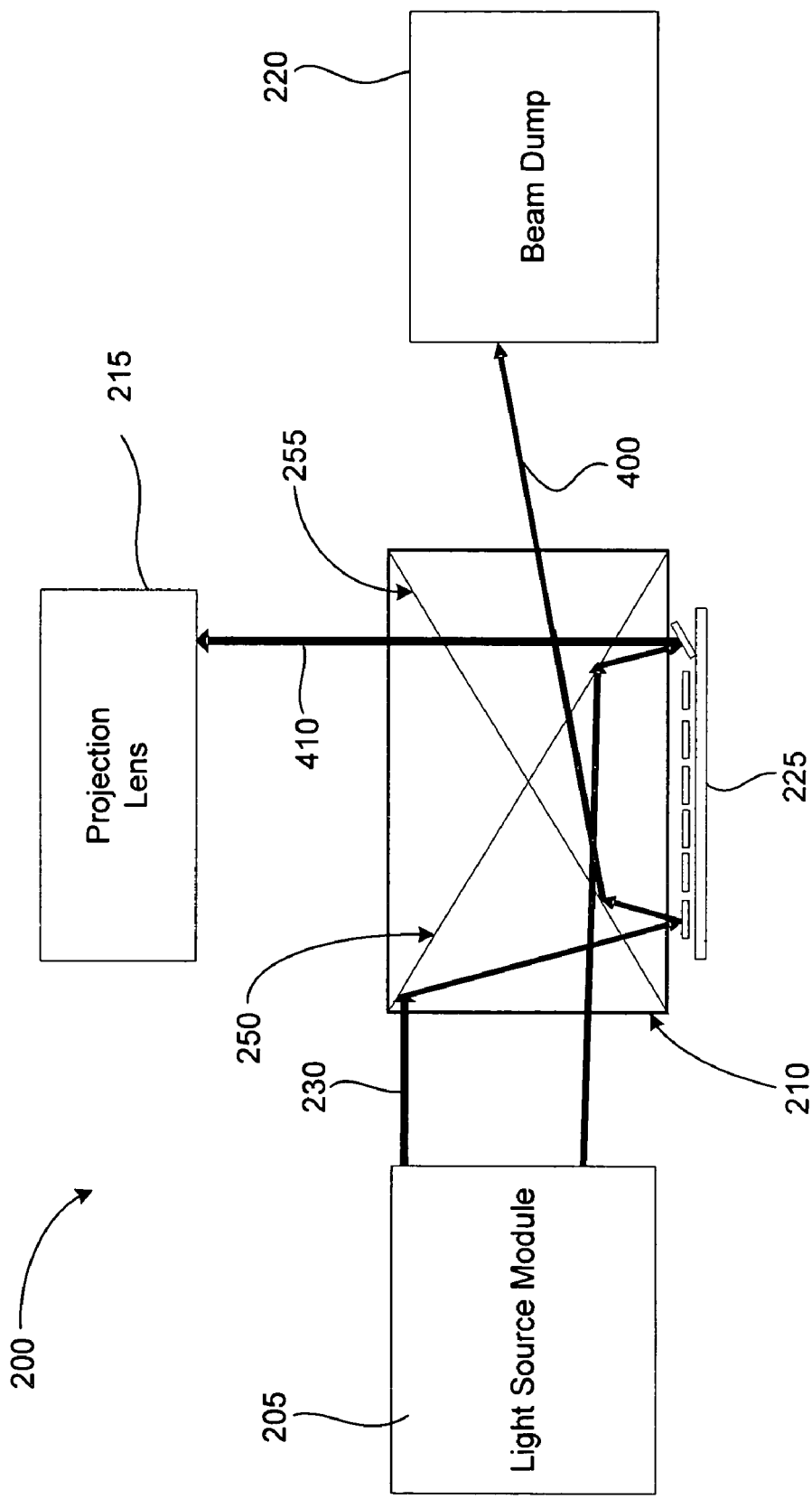
FIG. 4 illustrates a projection path-edge ray and beam dump-edge ray of a projection assembly according to one exemplary embodiment.

FIGS. 2-4 illustrate a projection assembly (200) that includes a light source module (205), a total internal reflection (TIR) prism (210), a projection lens (215), a beam dump (220), and a light modulator panel (225). As shown in FIG. 2, light (230) is generated by the light source module (205) and is directed to the TIR prism (210). As will be discussed in more detail below, the TIR prism (210) directs the light to the light modulator panel (225). The light modulator panel (225) modulates the light to form display light (235) and non-display light (240; FIG. 3). The TIR prism (210) spatially separates the display light (235) and the non-display light (240; FIG. 3). Accordingly, the TIR prism (210) reduces the amount of non-display light (240; FIG. 3) that is directed to the projection lens (215) and hence the amount of undesired light that reaches the display surface. Thus, the TIR prism (210) may provide for an increased contrast ratio of a displayed image. The path of an exemplary ray of display light will now be discussed.

The light source module (205) may generate sequentially varying light (230), as discussed above, and direct the light to the TIR prism (210). The TIR prism (210) includes first and second internal reflection interfaces (250, 255). The first and second internal reflection interfaces (250, 255) intersect, such that an "X" is formed. The internal angles of the TIR prism (210) may range between 38 and 88 degrees and between 142 and 92 degrees for the complimentary angles. In particular, these angles may further be varied between about 61 and 71 degrees, such as an angle of approximately 66 degrees.

Light (230) from the light source module (205) enters the TIR prism (210) and is incident on the first internal reflection interface (250). The first internal reflection interface (250) selectively separates light based on its angle of incidence. In particular, light with an angle of incidence smaller than a critical angle is passed or transmitted through the first internal reflection interface (250).

Similarly, light with an angle of incidence that is equal to or greater than the critical angle is reflected. According to the present exemplary embodiment, the critical angle may be between about 43.6 and 29.2 degrees where the TIR prism (210) is formed of glass with an index of refraction of approximately 1.45 to 2.05.

The light (230) has an angle of incidence upon the first internal reflection interface (250) that is greater than the critical angle described above. Accordingly, the light (230) is reflected from the first internal reflection interface (250). The light (230) is then incident on the second internal reflection interface (255). The light (230) has an angle of incidence relative to the second internal reflection interface (255) that is less than the critical angle, and is therefore transmitted through the second internal reflection interface (255). The light (230) exits the TIR prism (210) and is then directed to the light modulator panel (225). In some instances, the light (230) from the light source module (205) may be incident first on the second internal reflector interface (255). In such instances, the light (230) has an angle of incidence below the critical angle, and is thus transmitted to the first internal reflection interface (255), which reflects the light (230). In either case, the first internal reflector interface (255) directs the light (230) toward the light modulator panel (225).

The light modulator panel (225) according to the present exemplary embodiment is a reflective type modulator panel (225). FIG. 2 illustrates light (230) that is incident on an activated pixel (260), while FIG. 3 illustrates light (230) that is incident on a non-activated pixel (265). Each individual pixel includes a reflective plate (270) that is selectively tilted. For example, according to the present exemplary embodiment, the reflective plate (270) of an unactivated pixel (260) may remain untilted or flat. Similarly, according to the present exemplary embodiment, the reflective plate (270) of an activated pixel (265) may be tilted to direct light incident thereon toward the projection lens (215). The range of the tilt between the inactivated and activate may be less than about 15 degrees.

By controlling the frequency with which each pixel of the light modulator panel (225) is activated, the light modulator panel (225) is able to produce an output that varies between light and dark. Thus, the output may form an image having portions that vary from light to dark. Further, as previously discussed, the light (230) may be sequentially varying light. Accordingly, by controlling the output of the light modulator panel (225) when a color of light is directed thereon, the light modulator panel (225) may form sequential sub-images. When the sub-images are formed with sufficient frequency, the sub-images will be perceived as a single full-color image. The paths of two beams of light will be discussed with reference to display light (235) and non-display light (240).

Display light (235) is directed from the activated pixel (260) toward the projection lens (215). In particular, the display light (235) is incident on the first and second internal reflection interfaces (250, 255). For example, a portion of display light (235) directed from the left side of the light modulator panel (225) will cross the second internal reflection interface (255) and then the first internal reflection interface (250). Other portions of display light (235) will pass through the first internal reflection interface (250) followed by the second internal reflection interface (255). Still other portions of display light (235) will be directed through the intersection of the first and second internal reflection interfaces (250, 255), as seen in FIG. 4.

In each case, a substantial portion of display light (235) has an angle of incidence relative to each of the first and second internal reflection interfaces (250, 255) that is below the critical angle. Accordingly, a substantial portion of the display light (235) will pass through each of the first and second internal reflection interfaces (250, 255) and exit the TIR prism (210). As the light exits the TIR prism (210), it is directed to the projection lens (215). Further, the faces of the prism (210) may be generally orthogonal to adjacent surfaces. The beam dump (220) and projection lens (230) may be placed in optical communication with adjacent orthogonal surfaces.

FIG. 3 illustrates the light (230) incident on a non-activated pixel (265). In FIG. 3, when light (230) is incident on a non-activated pixel (265), the light (230) is reflected away from the reflective plate (270). The non-display light (240) shown is directed to the second internal reflection interface (255). The particular non-display light (240) shown in FIG. 3 is first incident on the first internal reflection interface (250) with an angle of incidence that is less than the critical angle. Consequently, the non-display light (240) is passed through the first internal reflection interface (250) where it is incident on the second internal reflection interface (250).

The non-display light (240) has an angle of incidence relative to the second internal reflection interface (255) that is larger than the critical angle. Accordingly, the non-display light (240) is reflected away from the second internal reflection interface (255) and out of the TIR prism (210). The non-display light (240) is thus spatially separated from the display light (235). The degree of spatial separation may be greater than twice the range of tilt discussed above. In particular, according to the present exemplary embodiment, the degree of spatial separation is greater than about 30 degrees and may be about 90 degrees. As the non-display light (240) exits the TIR prism (210), it is directed to the beam dump (220).

The beam dump (220) reduces or minimizes the possibility that the non-display light (240) will reach the projection lens (215). According to one exemplary embodiment, the beam dump (220) includes a light-absorbing surface that is shaped to trap and absorb light that is incident thereon. By absorbing substantially all of the non-display light (240) that is incident thereon, the beam dump (220) reduces or minimizes the possibility that the non-display light (240) will reach the projection lens (215). As a result, directing the non-display light (240) away from the projection lens (215) and to the beam dump (220) may increase the contrast ratio of an image projection assembly (200).

In addition to directing display light (235) to the projection lens (215) as shown in FIG. 2 and to directing non-display light (240) to the beam dump (220) as shown in FIG. 3, the TIR prism (210) may provide for a relatively short back focal distance (BFD), as will now be discussed in more detail with reference to FIG. 4.

FIG. 4 illustrates a beam dump edge ray (400), also known as an illumination edge ray, and a projection path edge ray (410). As previously discussed, the back focal distance depends, at least in part, on the point at which the beam dump edge ray (400) and the projection path edge ray (410) intersect. The beam dump edge ray (400) represents the spatial limit of the non-display light (240) that is directed to the beam dump (220) from one end of the light modulator panel (225). Similarly, the projection path edge ray (410) represents the spatial limit of display light (235) from the opposite end of the light modulator panel (225). Accordingly, the intersection of the beam dump edge ray (400) and the projection path edge ray (410) represent the point at which projected rays are substantially separated from non-projected rays.

It may be desirable to substantially separate the beam dump edge ray (400) and the projection path ray (410) at a point before the projection path edge ray (410) enters the projection lens (215). By thus separating the beam dump edge ray (400) from the projection path ray (410), the amount of non-display light (240) that is directed to the projection lens (215) is minimized, such that the contrast ratio of an image produced by the projection assembly may be relatively high.

As seen in FIG. 4, the paths of the beam dump edge ray (400) and the projection path edge ray (410) diverge before they exit the TIR prism (210). In particular, the beam dump edge ray (400) takes a path sufficiently divergent from the projection path edge ray (400) so as to minimize the possibility that the beam dump edge ray (400) will be incident on the projection lens (215). As introduced, this point of divergence may occur before the beam dump edge ray (400) and the projection path edge ray (410) exit the TIR prism (210). Accordingly, display light (235) is spatially separated from non-display light (240) before the light exits the TIR prism (210). This separation may allow the projection lens (215) to be placed relatively close to the TIR prism (210). The location of the projection lens (215) relative to the TIR prism (210), which may also be referred to as the back focal distance, may thus be reduced due to the spatial separation of the beam dump edge ray (400) and the projection path edge ray (410).

Returning again to FIGS. 2 and 3, the degree to which the reflective plate (270) tilts between an activated state and a non-activated state to adequately separate the projected (235) and the non-display light (240) may also be reduced.

Method of Modulating Light

FIG. 5 illustrates an exemplary method of modulating light. The method begins by generating light (step 500). The light may be sequentially varying light according to one exemplary embodiment. The light is then directed to a prism (step 510).

The prism then directs the light to a light modulator panel (step 520). For example, a first internal reflection interface may have light directed thereto having an angle of incidence that is above a critical angle, and is thus reflected from the first internal reflection interface and directed to the light modulator panel.

The light modulator panel then modulates the light (step 530). According to one exemplary method, the light modulator panel may include an array of individual pixels. Each pixel may further include a reflective plate that is selectively tilted. According to the present method, when a pixel is ON, light incident thereon is directed toward display optics. Similarly, according to the present method, when a pixel is OFF, light incident thereon is directed away from the display optics.

This directed light, which may be referred to as display and non-display light respectively, is then directed back to the prism (step 540). The display light and non-display light enter the TIR prism at different angles. The angle of separation between the display light and non-display light depends, at least in part, on how much the reflective plates are tilted between ON and OFF states. As previously discussed, the range of tilt between the ON an OFF states may be less than about 15 degrees.

The prism then spatially separates the display and non-display light (step 550). According to the present exemplary method, the light is spatially separated by a second internal reflection interface. More specifically, display light from the light modulator panel is incident on the second internal reflection interface with an angle of incidence that is below the critical value and is thus transmitted through the internal reflection interfaces. This degree of separation may be larger than about twice the range of tilt of the reflective plates such that the angle of spatial separation may be greater than about 30 degrees or as much as 90 degrees or more. The transmitted display light is then directed to display optics (step 560).

The non-display light is incident on the same internal reflection interfaces at a different angle, as previously discussed. The resulting angle of incidence of the non-display light on the second internal reflection interface is above the critical angle such that the non-display light is reflected. The reflected non-display light is then directed to a beam dump (step 570). Thus, according to the present method, light is directed to a light modulator panel by a cross-internal reflection prism. The light modulator panel then directs display and non-display light back to the cross-internal reflection prism, which spatially separates the light and directs the display light to display optics and the non-display light to a beam dump.

In conclusion, a prism has been described herein for use in projection assemblies. In particular, a prism is described that includes crossed internal reflection interfaces. Each internal reflection interface is configured to selectively transmit or reflect a light ray incident thereon according to each light ray's angle of incidence. For example, those light rays with an angle of incidence below a critical angle of incidence are transmitted through the internal reflection interface, while light rays with an angle of incidence above the critical angle will be reflected by the internal reflection interface.

As introduced, the prism includes crossed internal reflection interfaces. The crossed internal reflection interfaces direct light from a light source module to a light modulator panel. The light modulator panel then directs projected and non-display light back to the prism. The prism directs light to a projection lens and non-display light to a beam dump. According to exemplary embodiments discussed below, the prism provides spatial separation of the projection and non-display light, thereby minimizing the possibility that non-display light will dilute the display light. As a result, the prism may provide for an increased contrast ratio of a displayed image.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection assembly, comprising:
    a prism including a first internal reflection interface, and a second internal reflection interface, wherein said second internal reflection interface crosses through said first internal reflection interface and said first internal reflection interface crosses through said second internal reflection interface, and
    a light modulator panel configured to modulate light received from said prism into display and non-display light
    wherein said first internal reflection interface is configured to reflect light from a light source to said light modulator panel and to transmit said display light from said light modulator panel, and said second internal reflection interface is configured to transmit said display light and said light from said light source and to reflect said non-display light.

2. The assembly of claim 1, and further comprising a beam dump and display optics, said prism being configured to direct said display light to said display optics and said non-display light to said beam dump.

3. The assembly of claim 2, wherein said prism provides an angle of spatial separation of display light and non-display light greater than about 30degrees.

4. The assembly of claim 2, wherein said second internal reflection interface is configured to direct said non-display light to said beam dump.

5. The assembly of claim 1, wherein said light modulator panel includes a plurality of individual pixels, at least one of said pixels including a reflective surface and being configured to be selectively tilted between on and off positions to form said display and non-display light.

6. The assembly of claim 1, wherein said light modulator panel is configured to direct said display light to said first and second internal reflection interfaces at an angle below a critical angle such that said display light is transmitted and to direct said non-display light to said second internal reflection interface at an angle above said critical angle such that said non-display light is reflected.

7. The assembly of claim 1, wherein said light modulator panel includes a plurality of light modulator devices, at least one of said light modulator devices having a reflective plate configured to be selectively tilted between on and off states.

8. The assembly of claim 7, wherein said reflective plate is configured to be tilted through a range of tilt of less than 15 degrees between said on and off states.

9. The assembly of claim 8, wherein said prism is configured to spatially separate said display light and said non-display light by at least twice said range of tilt.

10. The assembly of claim 8, wherein said prism is configured to spatially separate said display and non-display light by about 90 degrees.

11. The assembly of claim 1, wherein said second internal reflection interface is configured to reflect said non-display light directly to a beam dump.

12. A display system, comprising:
    an image processing unit;
    a light modulator panel coupled to said image processing unit and being configured to selectively modulate light incident thereon into display and non-display light;
    display optics;
    a beam dump; and
    a prism including a first internal reflection interface and a second internal reflection interface, said second internal reflection interface crosses through said first internal reflection interface and said first internal reflection interface crosses through said second internal reflection interface
    wherein said first internal reflection interface is configured to reflect said light incident on said light modulator panel and to transmit said display light from said light modulator panel, and said second internal reflection interface is configured to transmit said display light to said display optics and to reflect said non-display light to said beam dump.

13. The display system of claim 12, wherein said light modulator panel is a reflective type light modulator panel.

14. The display system of claim 12, wherein said reflective type light modulator panel includes a plurality of individual reflective pixels.

15. The display system of claim 14, wherein at least one of said reflective pixels includes a reflective top plate, said reflective top plate being configured to be rotated between and on and off positions.

16. A method of modulating light, comprising:
generating unmodulated light;
directing said unmodulated light to a prism, said prism including first and second crossed internal reflection interfaces;
reflecting said unmodulated light from said first internal reflection interface toward a light modulator panel;
forming display and non-display light with said light modulator panel;
directing said display light and non-display light back to said prism such that said display light is transmitted through said first and second reflection interfaces and said non-display light is reflected by said second reflection interface.

17. The method of claim 16, and wherein said transmitted display light is directed to display optics and said reflected non-display light is directed to a beam dump.

18. The method of claim 16, wherein forming said display and non-display light includes selectively tilting a plurality of reflective plates.

19. A display system, comprising:
means for generating light:
means for forming display and non-display light; and
a prism having first and second crossed internal reflection interfaces, wherein said second internal reflection interface crosses through said first internal reflection interface and said first internal reflection interface crosses through said second internal reflection interface,
wherein said first internal reflection surface is configured to reflect light from said means for generating light to said means for forming display and non-display light, and said second internal reflection surface is configured to transmit display light in a first direction and to reflect non-display light in a second direction away from said first direction.

20. The system of claim 19, wherein said means for generating light in optical communication with said prism.

21. The system of claim 19, and further comprising means for displaying said display light.

22. The system of claim 19, and further comprising means for absorbing said non-display light.

* * * * *

UNITED STATES PATENT AND TRADEMARK OFFICE
CERTIFICATE OF CORRECTION

PATENT NO. : 7,458,688 B2 Page 1 of 1
APPLICATION NO. : 11/101819
DATED : December 2, 2008
INVENTOR(S) : Scott Lerner et al.

It is certified that error appears in the above-identified patent and that said Letters Patent is hereby corrected as shown below:

In column 7, line 67, in Claim 1, after "light" insert -- ; --.

In column 8, line 14, in Claim 3, delete "30degrees." and insert -- 30 degrees. --, therefor.

In column 8, line 58, in Claim 12, after "interface" insert -- ; --.

In column 9, line 7, in Claim 15, delete "and" before "on".

In column 10, line 5, in Claim 19, delete "light:" and insert -- light; --, therefor.

In column 10, line 20, in Claim 20, after "light" insert -- is --.

Signed and Sealed this

Twenty-first Day of April, 2009

JOHN DOLL
*Acting Director of the United States Patent and Trademark Office*